United States Patent
Schroll

(10) Patent No.: US 7,231,725 B2
(45) Date of Patent: Jun. 19, 2007

(54) PROBING PIN AND PROBE SYSTEM EQUIPPED THEREWITH

(75) Inventor: Thomas Schroll, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/432,978

(22) Filed: May 11, 2006

(65) Prior Publication Data

US 2006/0265894 A1 Nov. 30, 2006

(30) Foreign Application Priority Data

May 11, 2005 (DE) .................... 10 2005 022 482

(51) Int. Cl.
*G01B 5/00* (2006.01)
(52) U.S. Cl. .............................. 33/559; 33/556; 33/503
(58) Field of Classification Search .......... 33/556–562, 33/503
See application file for complete search history.

(56) References Cited

U.S. PATENT DOCUMENTS

| 4,524,523 | A | | 6/1985 | Golinelli et al. | |
|---|---|---|---|---|---|
| 4,879,817 | A | | 11/1989 | McMurtry | |
| 5,299,360 | A | * | 4/1994 | Possati et al. | 33/559 |
| 5,321,895 | A | * | 6/1994 | Dubois-Dunilac et al. | 33/556 |
| 5,355,589 | A | | 10/1994 | Madlener et al. | |
| 5,517,124 | A | * | 5/1996 | Rhoades et al. | 33/559 |
| 6,799,378 | B2 | * | 10/2004 | Schopf et al. | 33/556 |
| 6,952,885 | B2 | * | 10/2005 | Schopf | 33/559 |
| 2002/0092192 | A1 | * | 7/2002 | Schopf et al. | 33/556 |

FOREIGN PATENT DOCUMENTS

| DE | 20 41 723 | 2/1972 |
|---|---|---|
| EP | 0 126 207 | 11/1984 |
| EP | 0 269 286 | 6/1988 |

* cited by examiner

*Primary Examiner*—Yaritza Guadalupe-McCall
(74) *Attorney, Agent, or Firm*—Kenyon & Kenyon LLP

(57) ABSTRACT

A probing pin includes a predefined breaking point, which is arranged between a first section and a second section of the probing pin. The two sections each have a longitudinal axis. In the region of the predetermined breaking point, at least one of the longitudinal axes emerges from the outer contour of the probing pin at at least two axially offset points. A probe system may be equipped with such a probing pin.

12 Claims, 3 Drawing Sheets

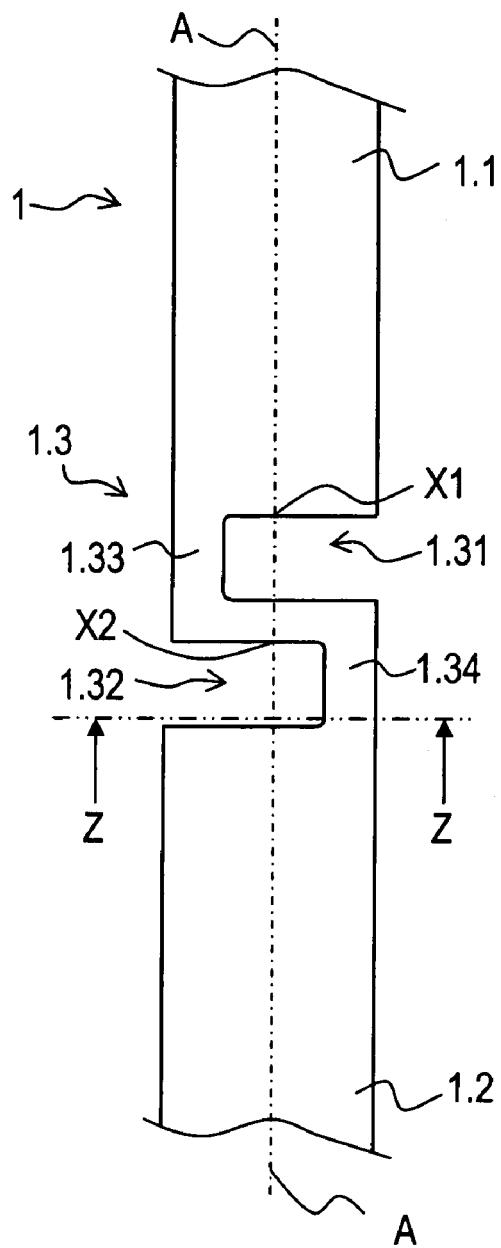
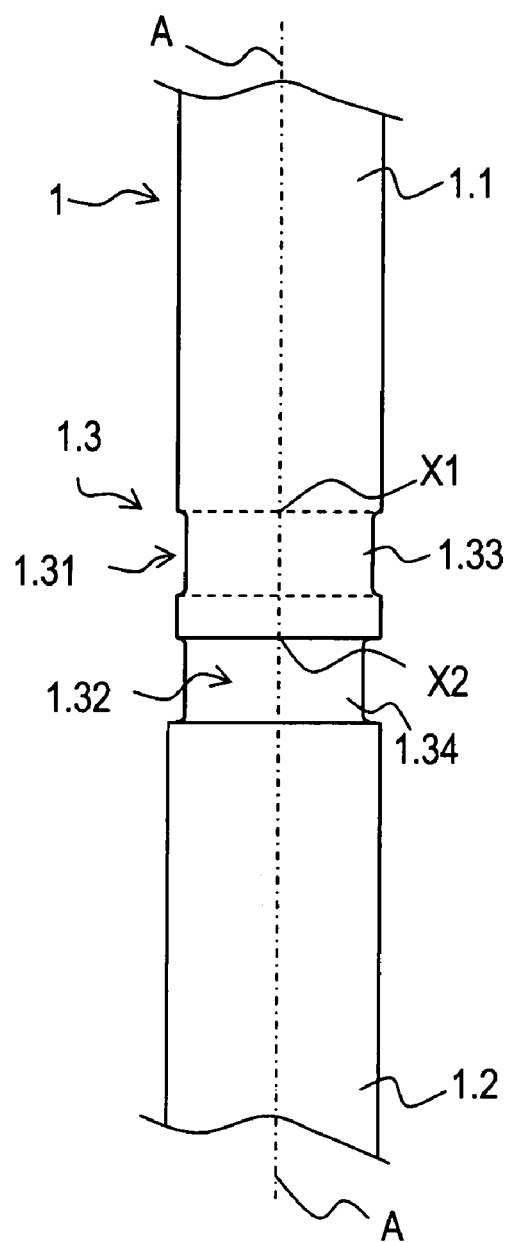
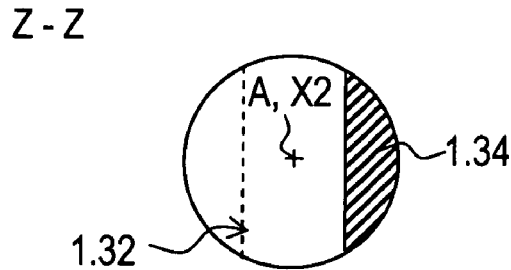

PROBING PIN AND PROBE SYSTEM EQUIPPED THEREWITH

CROSS-REFERENCE TO RELATED APPLICATIONS

The present application claims priority to Application No. 10 2005 022 482.2, filed in the Federal Republic of Germany on May 11, 2005, which is expressly incorporated herein in its entirety by reference thereto.

FIELD OF THE INVENTION

The present invention relates to a probing pin and to a probe system equipped therewith.

BACKGROUND INFORMATION

Such a probe system is often permanently affixed on a table of a tool machine and is used to measure a tool of the tool machine. In a test routine, the tool, which is clamped in a spindle of the tool machine, for example, is moved with respect to a probe disk of the probe system. The tool may also be measured in the rotating state.

As soon as the tool makes contact with the probe disk, a switching signal is sent to, for example, a numerical control of the tool machine. Since the actual position of the tool or the spindle axis is continuously determined by position-measuring devices of the tool machine, the current actual radius of the tool machine is able to be calculated. If appropriate, the numerical control may then take corrections into account for the subsequent processing steps.

In order to provide reliable generation of the switching signal even with the slightest deflection, a measuring device such as an optical measuring device is provided in the probe system. The deflection of the probe disk is mechanically transmitted to the measuring device via a probing pin. In view of the measuring accuracy, it should be provided that the probing pin is rigid. On the other hand, it cannot be excluded that unintentional movements of the tool occur. In order to prevent the introduction of unacceptable force into the measuring device in such a manner, predetermined breaking points are often provided on the probing pin as safety devices. Corresponding predetermined breaking points must thus have a relatively rigid design.

European Published Patent Application No. 0 269 286 describes a probe system which is suitable for measuring a tool in a tool machine. It provides no predetermined breaking point for the probing pin.

European Published Patent Application No. 0 126 207 describes a probe head whose loads as a result of an uncontrolled collision in the direction of the longitudinal axis of the probing pin are reduced in that the probing pin has a two-part design, the adjoining faces of the parts of the probing pin being beveled. Among other things, the design is believed to have the disadvantage that probing pins of this kind may be relatively expensive to manufacture.

SUMMARY

Example embodiments of the present invention may provide a probe head, which may be relatively simple to manufacture and may be impervious to uncontrolled collisions, e.g., in a collision direction parallel to the longitudinal axis of the probe element. Furthermore, a probe system hereof may provide precise measuring results and may be robust.

The probing pin may include a predetermined breaking point, which is arranged between a first section and a second section of the probing pin, the two sections each having a longitudinal axis. The probing pin is arranged such that at least one of the mentioned longitudinal axes projects from the outer contour of the probing pin at at least two axially offset points in the region of the predetermined breaking point. In the following text, axially offset points should be understood to mean that the two points are disposed at an offset relative to the longitudinal axis. The outer contour is the outer surface or surface area of the probing pin. The geometrical relations implemented herein relate to a probing pin as it presents itself under normal circumstances, e.g., in the new state or in a state in which no deformations occur due to external loading, such as they take place in the locked state.

Both sections may have a cylindrical basic form with a shared longitudinal axis.

The predetermined breaking point may include segment areas which extend in the axial direction and are arranged at an offset with respect to the circumferential direction. The cross-sections of the segment areas thus have a different orientation with respect to the longitudinal axis or are rotated about the longitudinal axis relative to each other.

The probing pin may be arranged such that the maximum diameter of the predetermined breaking point is smaller than or equal to the diameter of the first section or the diameter of the second section. This means that the region of the predetermined breaking point does not project beyond the outer diameter of the first section or the second section as far as its diameter is concerned. Alternatively, both sections may have the same diameter.

The predetermined breaking point may have two recesses which may be arranged at a 180° offset with respect to the circumferential direction. When viewing the probing pin parallel to the longitudinal axis, the cross-sections of the recesses overlap according to the geometric arrangement of the probing pin.

Each recess may be surrounded by three planar regions.

The probing pin may alternatively also be arranged such that its predetermined breaking point includes a spiral-shaped recess. The spiral includes segment areas which are arranged at an offset relative to the circumferential direction.

Due to optimized characteristic of the probing pin with regard to its stiffness on the one hand and its rupture behavior on the other hand, the probing pin may be particularly suitable for exceptionally precise measuring devices. For example, in the case of such measuring devices, insufficient stiffness (e.g., in a plane having an orthogonal alignment with respect to the longitudinal axis of the probing pin) would become extremely noticeable. On the other hand, measuring systems of this type are also not insensitive to excessive mechanical loading, which may be avoided by the arrangement of the predetermined breaking point of the probing pin. For example, excessive loading parallel to the longitudinal axis of the probing pin may also be effectively excluded by the predetermined breaking point. Exceptionally precise measuring systems often operate on the basis of an optical measuring principle or a pressure-sensitive measuring principle (using piezo sensors or strain gauge sensors, for example). Example embodiments of the present invention include probe systems that have a contact sensor.

According to an example embodiment of the present invention, a probing pin includes: a first section; a second section; and a predefined breaking point arranged between the first section and the second section. At least one of (a) a longitudinal axis of the first section and (b) a longitudinal axis of the second section emerges from an outer contour of the probing pin at at least two axially offset locations in a region of the predefined breaking point.

The first section and the second section may be cylindrical and may include a common longitudinal axis.

The predefined breaking point may include segment areas that extend in an axial direction and are arranged at an offset with respect to a circumferential direction.

A maximum diameter of the predefined breaking point may be less than or equal to a diameter of at least one of (a) the first section and (b) the second section.

The first segment and the second segment may have the same diameter.

The predefined breaking point may include two recesses.

The predefined breaking point may include two segment areas arranged at a 180° offset with respect to a circumferential direction.

Each recess may be bordered by three planar areas.

According to an example embodiment of the present invention, a probe system includes: a probing pin, e.g., as described above; and a measurement device adapted to trigger a switching signal in accordance with a deflection of the probing pin.

The measurement device may be adapted to operate according to at least one of (a) an optical measurement principle and (b) a pressure-sensitive measurement principle.

The system may include a probe disk, the probing pin arranged between the probe disk and the measurement device to transmit the deflection.

According to an example embodiment of the present invention, a probe system includes: probe means; and measuring means for triggering a switching signal in accordance with a deflection of the probe means. The probe means includes: a first section; a second section; and a predefined breaking point arranged between the first section and the second section, at least one of (a) a longitudinal axis of the first section and (b) a longitudinal axis of the second section emerging from an outer contour of the probe means at at least two axially offset locations in a region of the predefined breaking point.

Further details and aspects of example embodiments of the present invention are explained in more detail below in the following description with reference to the appended Figures.

BRIEF DESCRIPTION OF THE DRAWINGS

FIG. 2a is a first side view of a probing pin according to an example embodiment of the present invention.

FIG. 2b is a second side view of a probing pin, rotated by 90° compared to the first side view of FIG. 2a.

FIG. 2c is a cross-sectional view in a region of the predetermined breaking point of the probing pin taken along the line Z—Z illustrated in FIG. 2a.

FIG. 3b is a plan view of the probing pin illustrated in FIG. 3a.

DETAILED DESCRIPTION

Figure 1:
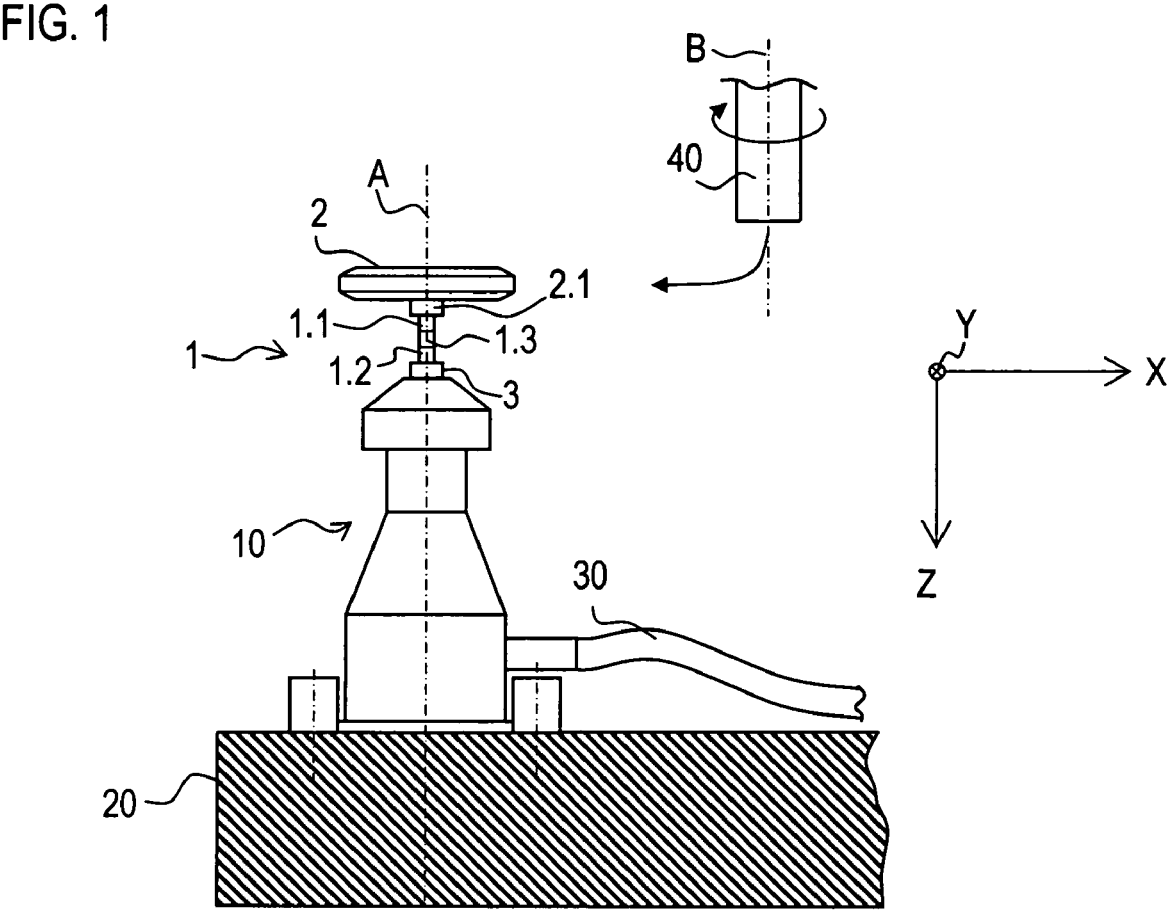
FIG. 1 illustrates a probe system having a probing pin.

FIG. 1 illustrates a probe system 10, which is fixed in place on a table 20 of a machine tool. The machine tool additionally includes a tool 40 which is movable relative to table 20 and is clamped into a spindle of the machine tool, the spindle being rotatable about an axis B. In order to allow the control of the machine tool to take the actual size of tool 40 into account, it is measured in the rotating state at regular intervals. In this manner, the wear of tool 40, for example, is able to be compensated for when determining the position of axis B of the spindle, which is required to process the workpiece.

Probe system 10 includes a probe disk 2 having a sleeve 2.1. Sleeve 2.1 has a hollow-cylindrical arrangement, so that a probing pin 1, e.g., a cylindrical first section 1.1, is able to be accommodated in sleeve 2.1. To axially secure probing pin 1 in sleeve 2.1, a clamping screw is radially screwed through sleeve 2.1. Furthermore, probing pin 1 includes a predetermined breaking point 1.3, which is arranged between first section 1.1 and a second section 1.2 of probing pin 1. Second section 1.2 is clamped in an additional sleeve 3 analogously to the securing of first section 1.1. Sleeve 3 is connected to a measuring device in the interior of probe system 10. A deflection of sleeve 3 (and thus of probe disk 2) triggers a switching signal, which is transmitted to a controller via a cable 30.

FIG. 2a is a partial side view of probing pin 1. As already mentioned, probing pin 1 includes a first section 1.1 and second section 1.2, both sections 1.1, 1.2 having a cylindrical basic configuration. The two cylindrical sections 1.1, 1.2 are arranged or aligned such that they have a common longitudinal axis A.

As illustrated, predetermined breaking point 1.3 may include two recesses 1.31, 1.32 and two segment areas 1.33, 1.34. Segment areas 1.33, 1.34 are arranged at a 180° offset relative to each other with respect to the circumferential direction. In other words, the two segment areas 1.33, 1.34 are rotated about longitudinal axis by 180°.

Such a probing pin 1 is produced, for example, by using as semi-finished part a cylindrical precision round pin made of hard metal into which, in the first step, recesses 1.31 are introduced by cutting by a grinding process. A grinding tool in the form of a disk is moved perpendicular to longitudinal axis A, so that the grinding tool ultimately dips into probing pin 1 to such a depth that it is intersected by longitudinal axis A. That is, the grinding tool dips into probing pin 1 past its center. The cross-section of segment areas 1.33, 1.34 is therefore smaller than one half of the cross-section of one of the two sections 1.1, 1.2 (see, e.g., FIG. 2c). Due to the geometry and the translatory motion of the grinding tool, recesses 1.31, 1.32 are each surrounded by three planar surfaces as inferable from FIG. 2a, for example.

After recess 1.31 has been produced, probing pin 1 is rotated by 180° about its longitudinal axis A and second recess 1.32 is worked, from the rear so to speak, using an analogous production step.

Recesses 1.31, 1.32 are therefore deep enough to be intersected by longitudinal axis A. As a result, probing pin 1 is configured such that longitudinal axis A emerges from the outer contour of probing pin 1 at two axially offset points X1, X2 in the region of predetermined breaking point 1.3.

Figure 3A:
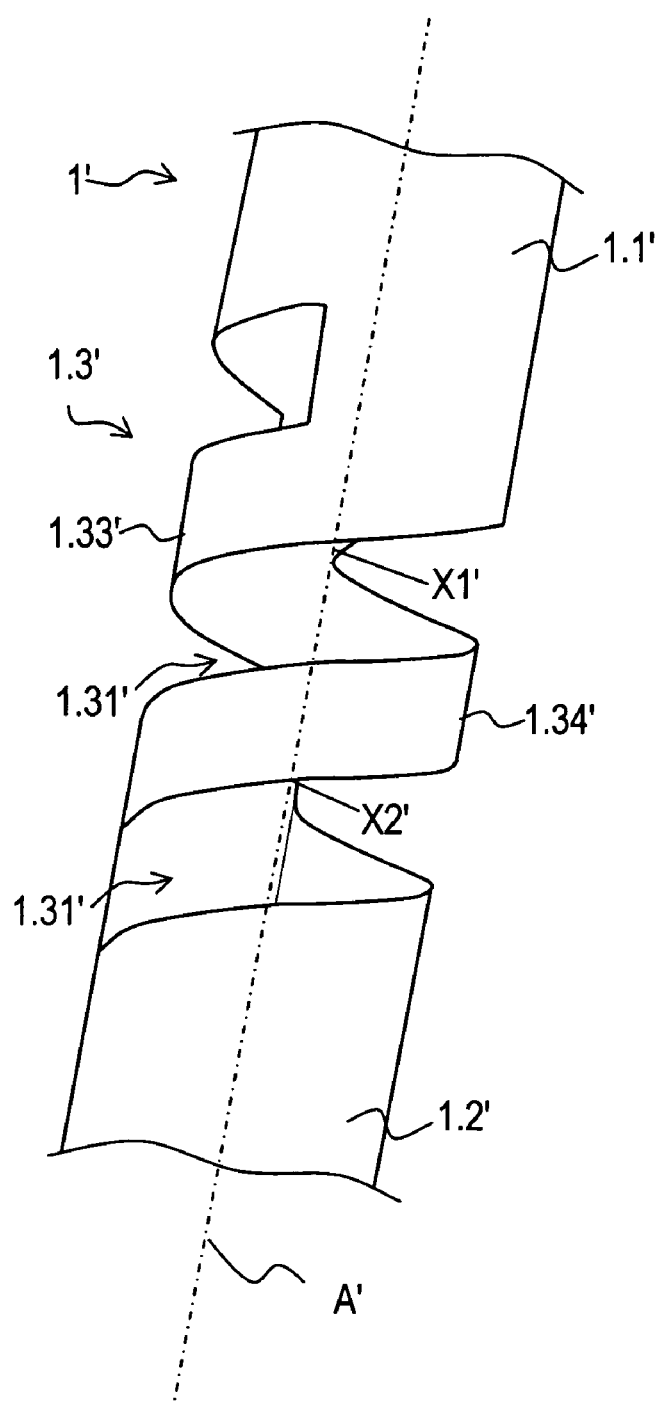
FIG. 3a is a perspective view of a probing pin according to an example embodiment of the present invention.
Figure 3B:
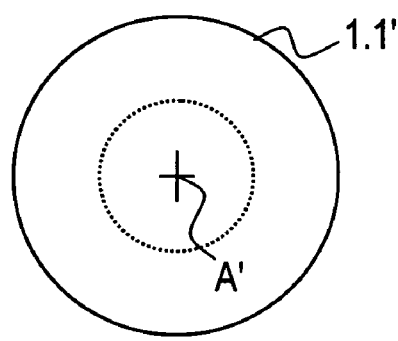

FIGS. 3a and 3b illustrate an alternative arrangement. As illustrated, probing pin 1 includes a first section 1.1' and a second section 1.2' each having a cylindrical basic form and a shared longitudinal axis A'. Arranged between sections 1.1', 1.2' is predetermined breaking point 1.3', which has a spiral-shaped recess 1.31'. To produce recess 1.31', a grinding tool, for example, is moved in a spiral pattern relative to longitudinal axis A' during processing of probing pin 1. The spiral path that then remains standing includes segment areas 1.33', 1.34', which are arranged at an offset relative to the circumferential direction. Consequently, in this example, probing pin 1' is configured such that longitudinal axis A' emerges from the outer contour of probing pin 1' at two axially offset points X1', X2' in the region of predefined breaking point 1.3'.

Probe system 10 includes an optically operating measuring device by which precise functioning of probe system 10 is able to be achieved. During the test routine, tool 40 is normally moved toward the probe disk such that longitudinal axis A and tool axis B in FIG. 1 are parallel, e.g., tool 40 approaches probe disk 2 from the radial direction (relative to probe disk 2), e.g., it moves in the X-Y plane. When tool 40 finally strikes probe disk 2, relatively high forces may act on probing pin 1 or 1', which, however, cause no damage to the measuring device. Due to the arrangement of predefined breaking point 1.3 or 1.3', probing pin 1 or 1' is so resilient that it does not break and is also not deformed to any significant extent.

However, if for some reason tool 40 strikes probe disk 2 from the Z-direction, e.g., parallel to longitudinal axis A or A', probing pin 1 or 1' would be pressed into the measuring device, which may damage it. The design and configuration of predefined breaking point 1.3 or 1.3' protects the measuring device from damage during such an undesired movement of tool 40 in that probing pin 1 or 1' breaks even before excess loading takes place. In probe system 10 or in probing pin 1, 1', the break force with respect to forces directed parallel to the X-Y plane is greater than the break force with respect to forces that are aligned orthogonally thereto and which thus act parallel to the Z-axis or to longitudinal axis A or A'.

What is claimed is:

1. A probing pin, comprising:
   a first section;
   a second section; and
   a predefined breaking point arranged between the first section and the second section;
   wherein at least one of (a) a longitudinal axis of the first section and (b) a longitudinal axis of the second section emerges from an outer contour of the probing pin at at least two axially offset locations in a region of the predefined breaking point.

2. The probing pin according to claim 1, wherein the first section and the second section are cylindrical and include a common longitudinal axis.

3. The probing pin according to claim 1, wherein the predefined breaking point includes segment areas that extend in an axial direction and are arranged at an offset with respect to a circumferential direction.

4. The probing pin according to claim 1, wherein a maximum diameter of the predefined breaking point is less than or equal to a diameter of at least one of (a) the first section and (b) the second section.

5. The probing pin according to claim 1, wherein the first segment and the second segment have a same diameter.

6. The probing pin according to claim 1, wherein the predefined breaking point includes two recesses.

7. The probing pin according to claim 6, wherein the predefined breaking point includes two segment areas arranged at a 180° offset with respect to a circumferential direction.

8. The probing pin according to claim 6, wherein each recess is bordered by three planar areas.

9. A probe system, comprising:
   a probing pin including:
      a first section;
      a second section; and
      a predefined breaking point arranged between the first section and the second section, at least one of (a) a longitudinal axis of the first section and (b) a longitudinal axis of the second section emerging from an outer contour of the probing pin at at least two axially offset locations in a region of the predefined breaking point; and
   a measurement device adapted to trigger a switching signal in accordance with a deflection of the probing pin.

10. The system according to claim 9, wherein the measurement device is adapted to operate according to at least one of (a) an optical measurement principle and (b) a pressure-sensitive measurement principle.

11. The system according to claim 9, further comprising a probe disk, the probing pin arranged between the probe disk and the measurement device to transmit the deflection.

12. A probe system, comprising:
    probe means including:
       a first section;
       a second section; and
       a predefined breaking point arranged between the first section and the second section, at least one of (a) a longitudinal axis of the first section and (b) a longitudinal axis of the second section emerging from an outer contour of the probe means at at least two axially offset locations in a region of the predefined breaking point; and
    measuring means for triggering a switching signal in accordance with a deflection of the probe means.

* * * * *